United States Patent
Geirhofer et al.

(10) Patent No.: US 9,203,552 B2
(45) Date of Patent: Dec. 1, 2015

(54) UNIFIED FEEDBACK FRAMEWORK FOR MU-MIMO ENHANCEMENT BASED ON INDICATION OF PREFERRED PRECODER PAIRINGS

(75) Inventors: Stefan Geirhofer, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 155 days.

(21) Appl. No.: 13/227,322

(22) Filed: Sep. 7, 2011

(65) Prior Publication Data

US 2012/0057482 A1  Mar. 8, 2012

Related U.S. Application Data

(60) Provisional application No. 61/380,804, filed on Sep. 8, 2010, provisional application No. 61/389,480, filed on Oct. 4, 2010.

(51) Int. Cl.
| | |
|---|---|
| *H04B 7/06* | (2006.01) |
| *H04L 1/00* | (2006.01) |
| *H04L 1/06* | (2006.01) |
| *H04L 25/03* | (2006.01) |

(52) U.S. Cl.
CPC ............ *H04L 1/0026* (2013.01); *H04B 7/0639* (2013.01); *H04L 1/0029* (2013.01); *H04L 1/0031* (2013.01); *H04L 1/0675* (2013.01); *H04L 2025/03802* (2013.01)

(58) Field of Classification Search
CPC ...... H04B 7/452; H04B 7/0632; H04B 7/063; H04L 1/0026

USPC .......................................................... 370/252
See application file for complete search history.

(56) References Cited

U.S. PATENT DOCUMENTS

| | | | |
|---|---|---|---|
| 2008/0013610 A1 | 1/2008 | Varadarajan et al. | |
| 2008/0101498 A1 | 5/2008 | Han et al. | |
| 2008/0132281 A1 | 6/2008 | Kim et al. | |
| 2009/0074099 A1 | 3/2009 | Zheng et al. | |
| 2009/0086842 A1 | 4/2009 | Shi et al. | |
| 2009/0097586 A1 | 4/2009 | Ko et al. | |
| 2009/0122857 A1* | 5/2009 | Li et al. ......................... 375/239 |
| 2009/0154588 A1* | 6/2009 | Chen et al. ..................... 375/267 |
| 2009/0323849 A1* | 12/2009 | Bala et al. ..................... 375/267 |
| 2011/0080965 A1* | 4/2011 | Liu et al. ....................... 375/260 |
| 2011/0103287 A1 | 5/2011 | Ma et al. | |

(Continued)

FOREIGN PATENT DOCUMENTS

| | | |
|---|---|---|
| CN | 101682380 A | 3/2010 |
| CN | 101771510 A | 7/2010 |
| KR | 20090038090 A | 4/2009 |
| WO | 2008147121 A1 | 12/2008 |

OTHER PUBLICATIONS

Qualcomm Inc., "Advantages of Unified Feedback for Enhanced MU-MIMO Operation in LTE-A," 3GG Draft: R1-104802 Unified Feedback, 3rd Generation Partnership Project (3GPP), Aug. 23-27, 2010.

(Continued)

*Primary Examiner* — Benjamin Lamont
(74) *Attorney, Agent, or Firm* — Patterson & Sheridan, LLP (57) ABSTRACT

Certain aspects of the present disclosure relate to techniques for generating unified feedback framework for Multi User Multiple Input Multiple Output (MU-MIMO) enhancement based on indication of a preferred precoder pairings.

40 Claims, 4 Drawing Sheets

(56) References Cited

U.S. PATENT DOCUMENTS

| | | | |
|---|---|---|---|
| 2011/0142147 A1 | 6/2011 | Chen et al. | |
| 2011/0150004 A1* | 6/2011 | Denteneer et al. | 370/476 |
| 2011/0200131 A1* | 8/2011 | Gao et al. | 375/267 |
| 2012/0213169 A1* | 8/2012 | Wang et al. | 370/329 |
| 2012/0300868 A1* | 11/2012 | Chen et al. | 375/267 |

OTHER PUBLICATIONS

Qualcomm Inc., "Signaling Requirements for Transparent MU-MIMO Operation," 3GG Draft: R1-10483, 3rd Generation Partnership Project (3GPP), Aug. 23-27, 2010.

PCT International Search Report and Written Opinion for PCT/US11/050854, dated Nov. 18, 2011.

Alcatel-Lucent., "Further analysis of companion feedback performance and feedback signalling overhead reduction", 3GPP TSG-RAN WG1#62 R1-104398, Aug. 23, 2010.

Samsung: "Multi-hypothesis feedback in support of SU/MU-MIMO in LTE-A systems", 3GPP TSG-RAN WG1#62 R1-104601, Aug. 23, 2010.

Samsung: "Multi-component feedback for SU/MU-MIMO dynamic switching enhancement", 3GPP TSG-RAN WG1#61b R1-103663, Jun. 2010, pp. 1-10, URL: http://www.3gpp.org/ftp/tsg_ran/WG1_RL1/TSGR1_61b/Docs/R1-103663.zip.

* cited by examiner

UNIFIED FEEDBACK FRAMEWORK FOR MU-MIMO ENHANCEMENT BASED ON INDICATION OF PREFERRED PRECODER PAIRINGS

CLAIM OF PRIORITY UNDER 35 U.S.C. §119

The present application for patent claims benefit of U.S. Provisional Patent Application Ser. No. 61/380,804, entitled, "UNIFIED FEEDBACK FRAMEWORK FOR MU-MIMO ENHANCEMENT BASED ON INDICATION OF PREFERRED PRECODER PAIRINGS", filed Sep. 8, 2010, and U.S. Provisional Patent Application Ser. No. 61/389,480, entitled, "UNIFIED FEEDBACK FRAMEWORK FOR MU-MIMO ENHANCEMENT BASED ON INDICATION OF PREFERRED PRECODER PAIRINGS", filed Oct. 4, 2010, and assigned to the assignee hereof and hereby expressly incorporated by reference herein.

BACKGROUND

1. Field

Certain aspects of the present disclosure generally relate to wireless communications and, more particularly, to a method of generating a unified feedback framework for Multi User Multiple Input Multiple Output (MU-MIMO) enhancement based on indication of a preferred precoder pairings.

2. Background

Wireless communication systems are widely deployed to provide various types of communication content such as voice, data, and so on. These systems may be access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \le \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports both time division duplex (TDD) and frequency division duplex (FDD) operation. In a TDD system, the forward and reverse link transmissions are on the same frequency region so that the reciprocity principle may allow the estimation of the forward link channel from the reverse link channel. In both FDD and TDD systems, a feedback sent from the user terminal may be used among other methods to convey channel state information to a base station. The channel state information at the base station enables it to extract transmit beamforming gain on the forward link when multiple antennas are available at the base station.

Multi User Multiple Input Multiple Output (MU-MIMO) enhancements are being considered as an important aspect of LTE Release 10. As such, improvements to feedback reporting have extensively been studied, and it was shown that accurate feedback reporting can be one of the key enablers for efficient MU-MIMO operation and dynamic Single User/Multi User (SU/MU) switching. An important aspect of these studies was to determine whether or not MU-MIMO operation should be facilitated through additional feedback reports, or whether Single User Multiple Input Multiple Output (SU-MIMO) reporting of precoding matrix information (PMI) provides sufficient performance.

SUMMARY

Certain aspects of the present disclosure provide a method for wireless communications. The method generally includes generating, at a first user device, a feedback report with unified structure for single user (SU) and multi user (MU) communications, wherein a layer indicated in the feedback report is associated with an anticipated transmission by a scheduling apparatus to a second user device performed simultaneously with another anticipated transmission by the scheduling apparatus to the first user device, and transmitting the feedback report to the scheduling apparatus.

Certain aspects of the present disclosure relate to a first user device for wireless communications. The first user device generally includes means for generating a feedback report with unified structure for single user (SU) and multi user (MU) communications, wherein a layer indicated in the feedback report is associated with an anticipated transmission by a scheduling apparatus to a second user device performed simultaneously with another anticipated transmission by the scheduling apparatus to the first user device, and means for transmitting the feedback report to the scheduling apparatus.

Certain aspects of the present disclosure relate to a first user device for wireless communications. The first user device generally includes a first circuit configured to generate a feedback report with unified structure for single user (SU) and multi user (MU) communications, wherein a layer indicated in the feedback report is associated with an anticipated transmission by a scheduling apparatus to a second user device performed simultaneously with another anticipated transmission by the scheduling apparatus to the first user device, and a transmitter configured to transmit the feedback report to the scheduling apparatus.

Certain aspects of the present disclosure provide a computer readable medium containing executable instructions for wireless communications. The executable instructions generally include instructions for generating, at a first user device, a feedback report with unified structure for single user (SU) and multi user (MU) communications, wherein a layer indicated in the feedback report is associated with an anticipated transmission by a scheduling apparatus to a second user device performed simultaneously with another anticipated transmission by the scheduling apparatus to the first user device, and transmitting the feedback report to the scheduling apparatus.

Certain aspects of the present disclosure provide an access terminal. The access terminal generally includes at least one antenna, a first circuit configured to generate a feedback report with unified structure for single user (SU) and multi user (MU) communications, wherein a layer indicated in the feedback report is associated with an anticipated transmission by an access point to another access terminal performed simultaneously with another anticipated transmission by the scheduling apparatus to the access terminal, and a transmitter configured to transmit, via the at least one antenna, the feedback report to the access point.

Certain aspects of the present disclosure provide a method for wireless communications. The method generally includes receiving, at a scheduling apparatus from a plurality of apparatuses, feedback reports with unified structure for single user (SU) and multi user (MU) communications, and identifying, based on the feedback reports, at least two of the apparatuses for potential simultaneous transmissions from the scheduling apparatus to the at least two apparatuses, wherein information in a first of the feedback reports transmitted from a first of the at least two apparatuses matches information in a second of the feedback reports transmitted from a second of the at least two apparatuses.

Certain aspects of the present disclosure provide an apparatus for wireless communications. The apparatus generally includes means for receiving, from a plurality of apparatuses, feedback reports with unified structure for single user (SU) and multi user (MU) communications, and means for identifying, based on the feedback reports, at least two of the apparatuses for potential simultaneous transmissions from the apparatus to the at least two apparatuses, wherein information in a first of the feedback reports transmitted from a first of the at least two apparatuses matches information in a second of the feedback reports transmitted from a second of the at least two apparatuses.

Certain aspects of the present disclosure provide an apparatus for wireless communications. The apparatus generally includes a receiver configured to receive, from a plurality of apparatuses, feedback reports with unified structure for single user (SU) and multi user (MU) communications, and a first circuit configured to identify, based on the feedback reports, at least two of the apparatuses for potential simultaneous transmissions from the apparatus to the at least two apparatuses, wherein information in a first of the feedback reports transmitted from a first of the at least two apparatuses matches information in a second of the feedback reports transmitted from a second of the at least two apparatuses.

Certain aspects of the present disclosure provide a computer readable medium containing executable instructions for wireless communications. The executable instructions generally include instructions for receiving, at a scheduling apparatus from a plurality of apparatuses, feedback reports with unified structure for single user (SU) and multi user (MU) communications, and identifying, based on the feedback reports, at least two of the apparatuses for potential simultaneous transmissions from the scheduling apparatus to the at least two apparatuses, wherein information in a first of the feedback reports transmitted from a first of the at least two apparatuses matches information in a second of the feedback reports transmitted from a second of the at least two apparatuses.

Certain aspects of the present disclosure provide an access point. The access point generally includes at least one antenna, a receiver configured to receive, from a plurality of access terminals via the at least one antenna, feedback reports with unified structure for single user (SU) and multi user (MU) communications, and a first circuit configured to identify, based on the feedback reports, at least two of the access terminals for potential simultaneous transmissions from the access point to the at least two access terminals, wherein information in a first of the feedback reports transmitted from a first of the at least two access terminals matches information in a second of the feedback reports transmitted from a second of the at least two access terminals.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS, LTE and LTE-A are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE-A, and LTE-A terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE, LTE-A, and the Evolved UTRA.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

Figure 1:
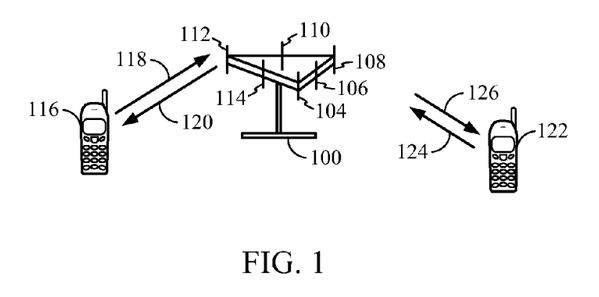
FIG. 1 illustrates an example multiple access wireless communication system in accordance with certain aspects of the present disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
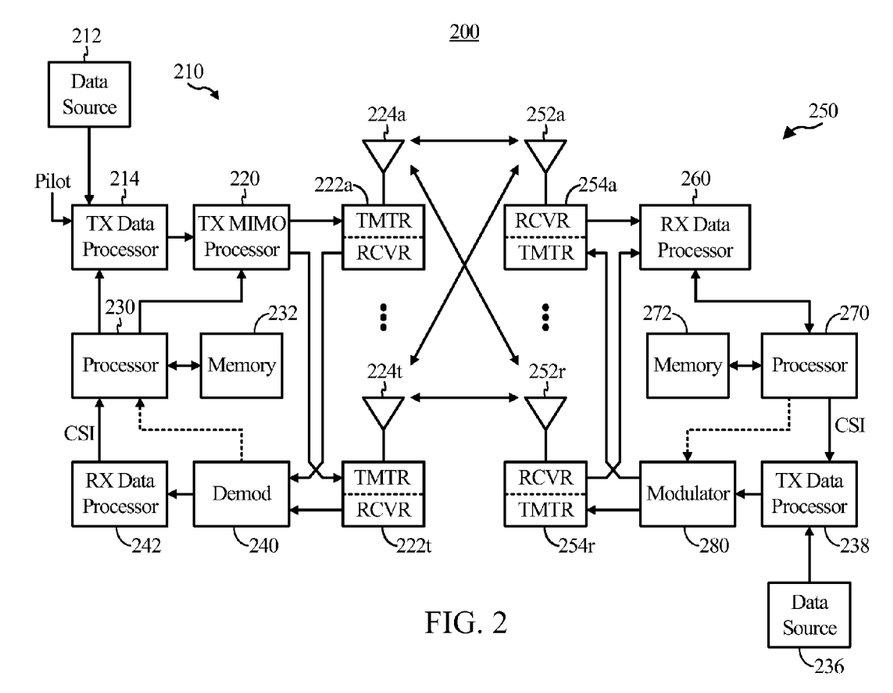
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

According to certain aspects of the present disclosure, a feedback report may be transmitted from any of the user terminals 116, 122 from FIG. 1 to the access point 100, and/or from the user terminal 250 from FIG. 2 to the access point 210. The accurate feedback reporting may be one of the key enablers for efficient operation in Multi User Multiple Input Multiple Output (MU-MIMO) wireless systems, and it may also provide dynamic Single User/Multi User (SU/MU) switching. In one aspect, the feedback reporting may be based on reporting precoding matrix information (PMI).

Figure 3:
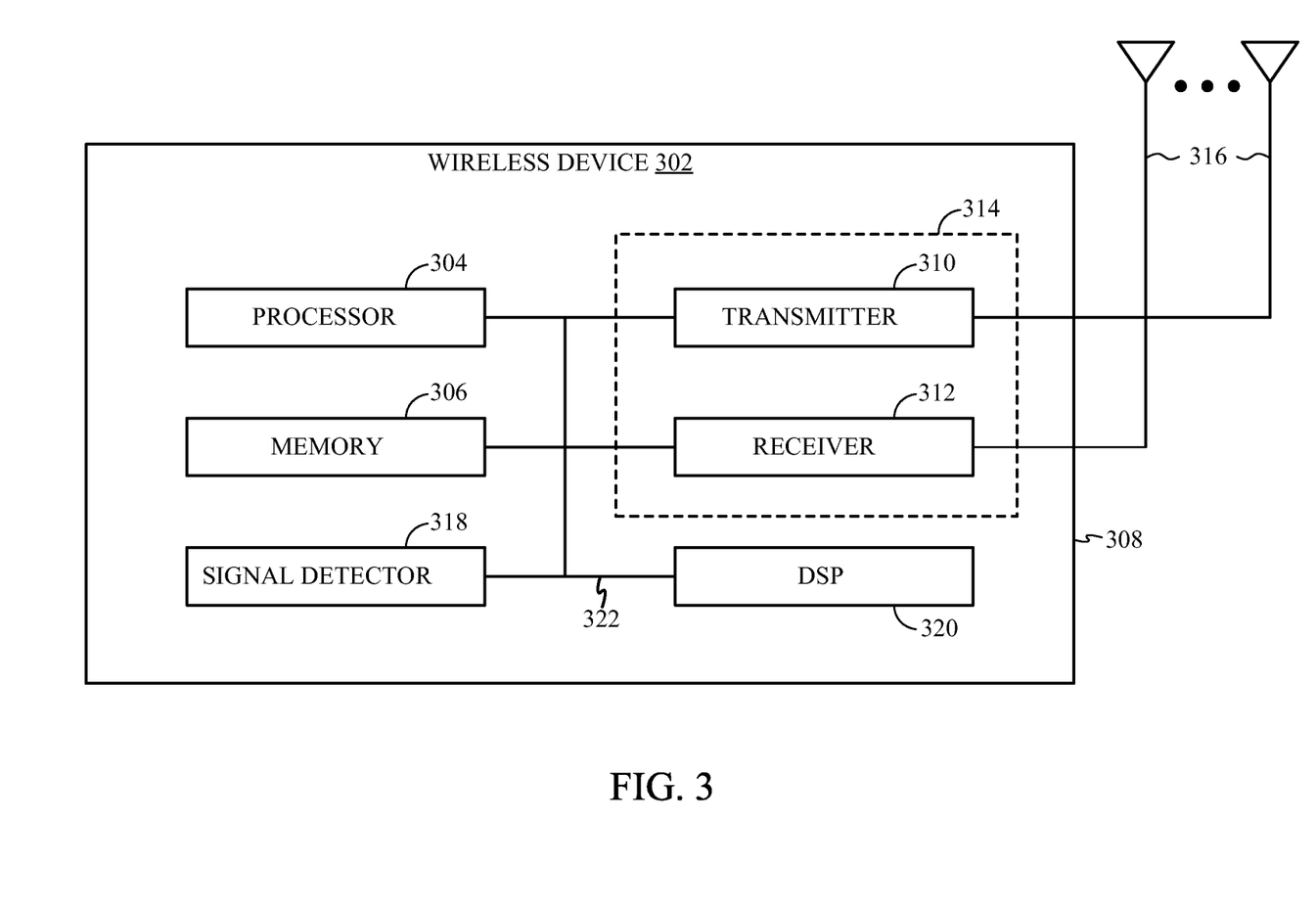
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

According to certain aspects of the present disclosure, a feedback report may be transmitted from the wireless device 302 to a base station serving the wireless device 302 (not shown in FIG. 3). The accurate feedback reporting associated with the wireless device 302 may be one of the key enablers for efficient operation in MU-MIMO wireless systems, and it may also provide dynamic SU/MU switching. In one aspect, the feedback reporting may be based on reporting the PMI.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect of the present disclosure, a channel structure is provided that preserves low PAPR properties of a single carrier waveform. At any given time, the channel may be contiguous or uniformly spaced in frequency.

Certain aspects of the present disclosure support a unified feedback framework which allows user equipment (UE) to tailor the PMI reporting for SU-MIMO operation to MU-MIMO operation, if desired. A key element of this framework may be that, even though PMI reports can be tailored to MU-MIMO operation, no separate MU-MIMO specific feedback reports are required.

Unified Feedback Framework for MU-MIMO Enhancement

Implicit PMI-based feedback may perform well for SU-MIMO based transmission schemes. However, for MU-MIMO operation, PMI reports with ranks greater than 1 may pose some challenges, especially if one of the UEs being scheduled in MU-MIMO operation is being allotted fewer layers than corresponding to its PMI report. In contrast, this challenge may not arise in explicit feedback schemes, in which individual channel direction information (CDI) is fed back. This problem may be only relevant for the case in which a PMI with a rank greater than 1 is reported; otherwise implicit and explicit feedback may be conceptually identical and provide very similar performance.

Another challenge relating to channel feedback may originate from the relatively coarse granularity of the PMI feedback. The LTE Release 10 may utilize the same codebook as LTE Release 8, which provides four-bit feedback for both rank-1 and rank-2 reports in case of an eNodeB with four transmit antennas. While this may be adequate for SU-MIMO operation, MU-MIMO performance may be more sensitive to feedback quantization as it aims at nulling interference to co-scheduled users. This effect may make the MU-MIMO user selection at the eNodeB more challenging as it is more difficult to assess how much interference may be generated to the co-scheduled UEs.

In the present disclosure, the latter challenge is addressed and methods are proposed for using regular SU-MIMO reporting mechanisms to inform the eNodeB of favorable precoder pairings.

In an aspect of the present disclosure, a unified feedback framework may improve the reporting by selecting PMIs partly based on how well they quantize the channel, instead of solely based on what capacity they may achieve. Specifically, this method may first identify a preferred SU-MIMO PMI that may maximize the SU-MIMO capacity. Then, in a second step, a set of candidate PMIs with at most a performance loss may be identified. This may be achieved by reexamining all PMIs and identifying those that have a performance loss no greater than a in terms of SU-MIMO capacity compared to the PMI selected initially. This step may ensure that no matter how the PMI is reselected in the following steps, the SU-MIMO performance may be guaranteed to suffer at most by a factor $\alpha$. Then, in a third step, among the set of candidate PMIs, the one which best quantizes the true channel direction may be selected. For example, in case of a rank-2 PMI report, the PMI whose precoder for the dominant layer is closest to the eigen-direction of channel may be selected. Finally, this PMI may be reported instead of the SU-MIMO PMI identified initially.

Extending Unified Feedback to Include Preferred Precoder Pairings

The unified feedback framework proposed in the present disclosure may exploit PMI, Channel Quality Indicator (CQI), and Rank Indicator (RI) signaling in order to formulate a unified way of conveying SU-MIMO reports with different ranks and MU-MIMO reports with preferred precoder pairings. Specifically, for the MU-MIMO specific feedback report, UE may exploit the fact that MU-MIMO typically operates in a mode where two users are paired and receive one layer each. As such, a rank-1 report may be typically sufficient for the UE to enable scheduling at the eNodeB side. However, the UE may exploit the fact that it can transmit a higher-rank report to convey additional information of what its rate would be if there were other layers scheduled at the same time. This may be especially useful for the rank-2 report, since in this case, the CQI and delta-CQI values may provide additional information about the strength and capacity that both layers offer. For a rank greater than two, this information may not be available since CQI and delta-CQI are codeword-specific and since more than two codewords may not be supported in LTE, individual information about each layer may be unknown in this case.

In the present disclosure, a procedure of conveying this information is addressed in more detail, and it is shown how this procedure can be used at the scheduler to improve performance. Also, the present disclosure addresses how this framework can be used in conjunction with conventional scheduling and fairness protocols at the eNodeB side. Further, the present disclosure focuses in detail on how unified operation can be achieved. This addresses different signaling options based on which the eNodeB can differentiate between SU-MIMO reports with different ranks (rank-1 and rank-2, in particular) and an MU-MIMO report.

Indication of Preferred Precoder Pairings

A key enabler of efficient MU-MIMO operation may consist of finding a good user pairing which may result in small intra-cell interference due to layers being transmitted to co-scheduled UEs. While it may be possible in typical Wide Area Network (WAN) deployments to perform exhaustive search across all UE pairings, it may be still difficult to perform efficient pairing since the feedback reports by UE may only convey a limited amount of information. The fact that these reports may be, by design, more geared towards SU-MIMO complicates the matter, especially due to the relatively low granularity of PMI feedback and the limited CQI information, which may be challenging to use in the case of a feedback with a rank greater than one.

As a result of these limitations, it may be quite difficult to estimate the performance that a specific UE pairing would achieve in MU-MIMO operation just by extrapolation from the SU-MIMO reports. As aforementioned in the paragraph [0059], an alternative PMI selection procedure can be considered, which may adjust the PMI selection such that the PMI may better quantize the channel as opposed to optimizing the sum capacity. However, as the PMI granularity remains the same, extrapolating MU-MIMO performance may remain challenging.

In this disclosure, it is proposed to change the UE reporting such that, when the UE believes that MU-MIMO operation may be useful, it may not only convey its own channel direction information, but may also provide some information about the preferred precoder pairing. However, in contrast to other methods such as best companion PMI feedback that may rely on sending separate MU-MIMO specific PMI reports, the present disclosure proposes a way of integrating PMI feedback into the existing feedback framework.

The proposed procedure can be described based on rank-2 PMI reports. Later in the text it is provided how this procedure may be integrated into both rank-1 and rank-2 PMI feedback. Specifically, instead of considering the columns of the rank-2 PMI as representing layers that may be transmitted to a specific UE, it is considered that only a dominant layer may be transmitted to the UE, while the other layer may be used for a co-scheduled UE in MU-MIMO operation. Based on this assumption, the CQI and delta-CQI corresponding to the feedback report may be utilized at a scheduling apparatus (e.g., at an eNodeB) to pair the UEs based on their feedback, ideally in such a way that their precoders are perfectly compatible. If this is the case, then the CQI corresponding to the dominant layer per UE (determined by CQI and delta-CQI reports) may comprise interference from the co-scheduled UE and may greatly enhance the eNodeB's ability to forecast the spectral efficiency conditioned on this MU-MIMO pairing.

It should be noted that if rank-2 reports are used for MU-MIMO operation only, then it is not required to send two CQI values. Even signaling two PMIs may be avoided, if certain assumptions are put on the underlying codebook. Specifically, the CQI and delta-CQI may be solely used to determine the actual CQI of the dominant layer (assuming an anticipated co-scheduled transmission); knowing the exact CQI for the recommended precoder pairing may not be required.

The above may serve as a motivation to further refine the procedure. Specifically, it may be possible to first identify a set of all rank-1 precoders which may provide performance no worse than a compared to the best rank-1 precoder. For each precoder in this set of candidate PMIs, the UE may look up the corresponding rank-2 PMI with the rank-1 precoder as its first column, which may be possible as long as the codebook is fully nested (e.g., the four transmit antenna codebook used for LTE Release 8 and 10 possesses this property). The capacity computation may then proceed based on the rank-2 PMI corresponding to the selected rank-1 precoder, while assuming that the other layer of the rank-2 PMI may be utilized for a co-scheduled UE. Therefore, the other layer may act as interference. Finally, the rank-1 precoding index corresponding to preferred MU-MIMO performance may be fed back, along with the CQI obtained under the MU-MIMO assumption.

At a scheduling apparatus (e.g., eNodeB), the feedback may be utilized to perform MU-MIMO user pairing. For example, if it is known that a PMI was determined under the MU-MIMO assumption, then the eNodeB may be able to determine which precoder pairing was assumed based on the above discussion, and may try to find a feedback report from another UE that is compatible. Specifically, the eNodeB may determine whether there exists another UE which indicated a precoder that matches the first UE's precoder pairing assumption. If the MU-MIMO assumption is not explicitly signaled, then some implicit threshold assumptions may be used to determine whether a report was performed for MU-MIMO.

If enough users are present and if the codebook comprises swapped precoder pairs, then it may be possible to find pairings with two compatible columns. Further, instead of matching two rank-1 reports, it may also be possible to match a rank-1 user (with an MU-MIMO feedback, as described above) with a rank-2 feedback that may comprise compatible columns and whose dominant layer may align with the precoder pairing assumption of the first UE.

Methods for Feedback Signaling

In the above, a technique is described that may enable a UE to exploit the nested codebook structure in order to utilize the rank-1 SU-MIMO report for feeding back an MU-MIMO report with the assumed precoder pairing. It can be observed that, by just following this procedure, the eNodeB may not be able to distinguish between the "modified" rank-1 report computed under the MU-MIMO hypothesis and the true rank-1 SU-MIMO report. In order to avoid this problem, it may be possible to adapt the signaling to convey this MU-MIMO specific reporting. In particular, there are several options of integrating this information into the existing LTE-A feedback framework.

In one aspect of the present disclosure, a specific value of the Rank Indicator (RI) may be reserved for signaling MU-MIMO reporting. For example, good candidates may be some of relatively high ranks such as rank 6 or 7, which may not be likely to be used frequently in practice. However, setting the RI to be equal to 8 cannot be considered, as this value of RI may be necessary for achieving peak rate requirements.

In conjunction with the above, a new signaling bit may be introduced, which may swap the first and second spatial layers. This may not be necessary if either delta CQI is available or the codebook already comprises all symmetric entries, i.e., for every precoder, the symmetric pair with the first and second layers swapped may be also an element of the codebook. Alternatively, two reserved RI values may be used. The first reserved RI value may indicate a nominal order of layers, and the second reserved RI value may indicate the swapped order of layers. The second reserved RI value may not be required, if either delta CQI is available or the codebook already comprises all symmetric entries.

In another aspect of the present disclosure, some values of the delta CQI may be reserved for indicating the MU-MIMO specific report. Since only one actual CQI value may be required for MU-MIMO rate prediction, it may be considered to reserve the largest positive and negative value of the delta CQI for indicating the MU-MIMO report together with information on which of the layers in the rank-2 report should be associated with the dominant layer.

Link Adaptation

The link adaptation at the eNodeB may take into account the possibility of enhanced MU-MIMO feedback, as proposed in the present disclosure. However, it can be observed that the performance enhancements associated with indicating the preferred precoder pairing may be more pronounced when the number of UEs is large, because the probability that two UEs have compatible feedback reports increases.

In order to avoid compromising the performance when the number of UEs is relatively small, the eNodeB may consider the regular MU-MIMO operation as well, as aforementioned in the present disclosure. However, in order to capitalize on the improved MU-MIMO performance in the case that one or multiple matching UE reports can be identified, a backoff may be added to penalize the larger link adaptation error incurred by the regular MU-MIMO operation.

The aforementioned aspects of the present disclosure are mostly focused on the case in which preferred precoder pairings may be fed back using rank-1 SU-MIMO reporting procedures. In an aspect, the rank-2 reporting format comprising CQI and delta CQI values may be used for this purpose as well. Specifically, using the latter format has the benefit that it may be possible to convey the CQI for a single layer transmission both under the hypothesis of MU-MIMO and SU-MIMO. For example, in one aspect, the CQI value of the rank-2 report may be associated with the single layer transmission of the dominant layer (identified as part of the MU-MIMO report described above) without assuming that a co-scheduled layer exists. On the other hand, the delta CQI value may capture the CQI under the hypothesis that such a co-scheduled layer does exist. Capturing both values in the same report may provide the benefit of increasing flexibility at the eNodeB, which may thus more accurately schedule the user in a rank-1 transmission or in MU-MIMO operation, respectively.

In an aspect, the UE selection of preferred precoders may be restricted to a subset of precoders available in the codebook. For example, this may be carried out by semi-statically signaling a set of codebook indices among which the UE then proposes preferred precoders. The restricted subset of precoders may be signaled to the UE by the eNodeB through, for example, Radio Resource Control (RRC) signaling. This approach may have benefits in some scenarios, such as when channel conditions are fairly stable and the eNodeB has limited knowledge on other UEs that may be good pairing options for the UE being configured.

The aforementioned subset restriction for preferred precoder pairs may not be restricted to signaling a set of codewords from the precoding codebook. For example, in another aspect, one could consider performing the precoder pairing based on some other metric which may or may not depend on additional signaling from the eNodeB. Specifically, one could consider eNodeB signaling of preferred precoding directions based on which the UE may rank precoder pairs and select a preferred pair to be reported accordingly.

In another aspect, the signaling techniques described in this disclosure may be used for purposes other than indicating MU-MIMO specific reports. For example, in the context of heterogeneous networks, feedback reports corresponding to different time interlaces may experience very different interference conditions. This would in turn be expected to affect the rank that can be supported on such interlaces. However, it may not be possible to configure an RI value for each interlace and thus it is useful to enable techniques in which the rank can be conveyed by some other means, for example as part of the PMI or CQI information.

The signaling techniques captured in this disclosure are one means to accomplish this objective. Specifically, as a result of largely different interference conditions on different interlaces, CQI values are also expected to vary by a large degree. For example, one could consider that rank-2 is supported most of the time on a set of "good" interlaces, whereas rank-1 would be more beneficial on a different set of interlaces. For those interlaces, even though a rank-2 report needs to be sent, some combinations of the CQI or delta-CQI could be reserved and could thus convey that rank-1 is in fact more beneficial on that specific interlace.

Figure 4:
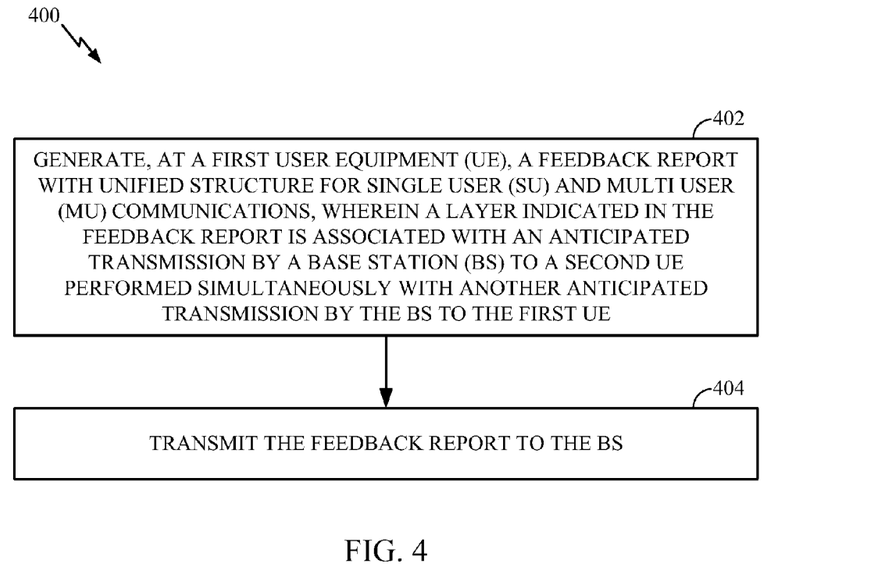
FIG. 4 illustrates example operations that may be performed at user equipment (UE) for reporting feedback in accordance with certain aspects of the present disclosure.

FIG. 4 illustrates example operations 400 that may be performed at a first UE for reporting feedback in accordance with certain aspects of the present disclosure. At 402, the first UE may generate a feedback report with unified structure for single user (SU) and multi user (MU) communications, wherein a layer indicated in the feedback report may be associated with an anticipated transmission by an eNodeB to a second UE performed simultaneously with another anticipated transmission by the eNodeB to the first UE. At 404, the first UE may transmit the feedback report to the eNodeB.

Figure 5:
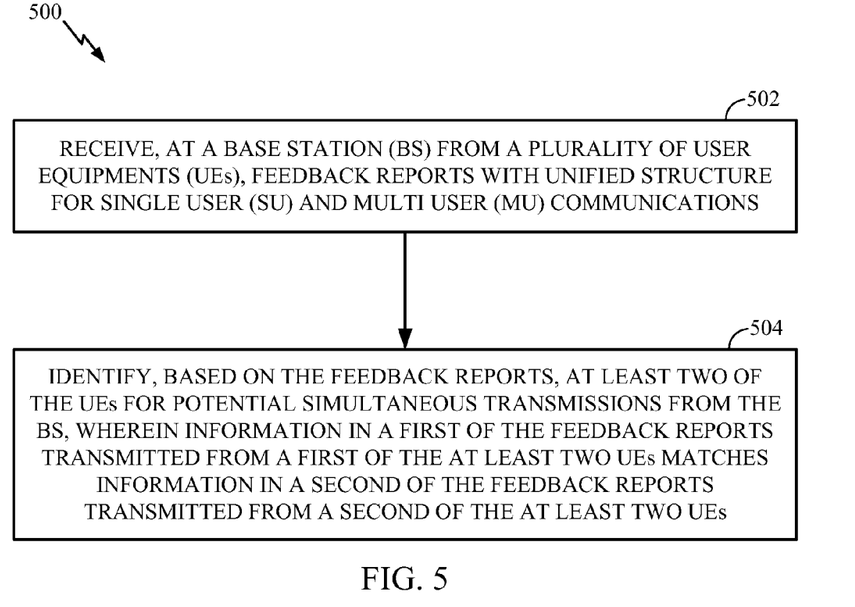
FIG. 5 illustrates example operations that may be performed at a scheduling apparatus for scheduling simultaneous multi user transmission in accordance with certain aspects of the present disclosure.

FIG. 5 illustrates example operations 500 that may be performed at an eNodeB in accordance with certain aspects of the present disclosure. At 502, the eNodeB may receive, from a plurality of UEs, feedback reports with unified structure for SU and MU communications. At 504, the eNodeB may identify, based on the feedback reports, at least two of the UEs for potentially simultaneous transmissions from the eNodeB, wherein information in a first of the feedback reports transmitted from a first of the at least two UEs may match information in a second of the feedback reports transmitted from a second of the at least two UEs.

Figure 4A:
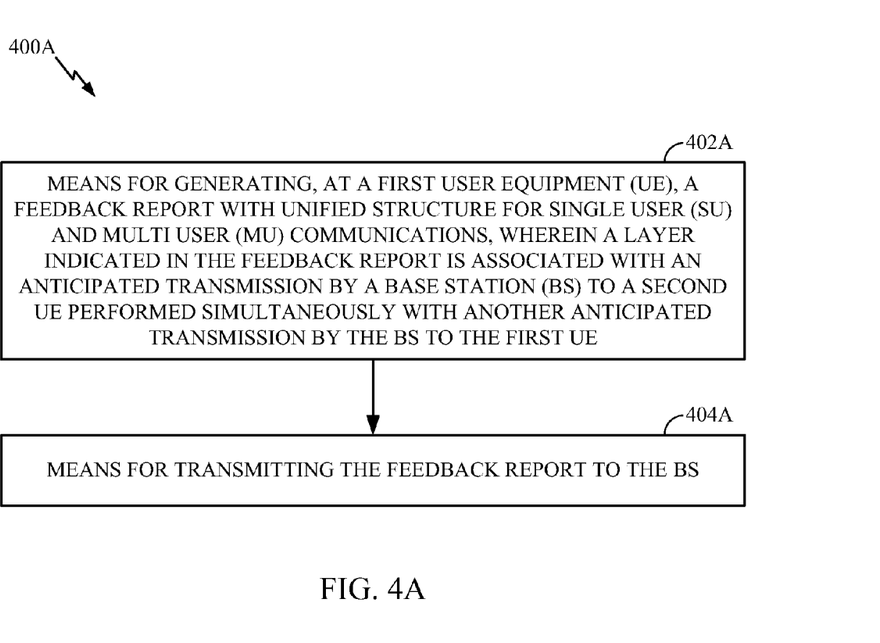
FIG. 4A illustrates example components capable of performing the operations illustrated in FIG. 4.
Figure 5A:
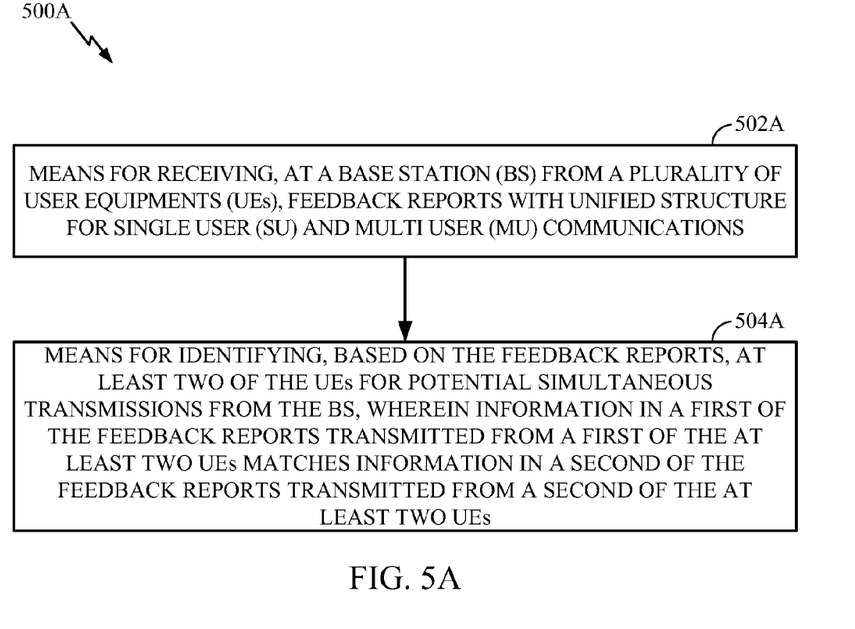
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIG. 4 and FIG. 5 correspond to components 400A and 500A illustrated in FIG. 4A and FIG. 5A.

For example, the means for generating may comprise an application specific integrated circuit, e.g., the processor 270 of the user terminal 250 from FIG. 2, or the processor 304 of the wireless device 302 from FIG. 3. The means for transmitting may comprise a transmitter, e.g., the transmitter 254 of the user terminal 250, or the transmitter 310 of the wireless device 302. The means for identifying may comprise an application specific integrated circuit, e.g., the processor 230 of the access point 210 from FIG. 2, the processor 270, or the processor 304. The means for signaling may comprise a transmitter, e.g., the transmitter 254, or the transmitter 310. The means for receiving may comprise a receiver, e.g., the receiver 222 of the access point 210, the receiver 254 of the user terminal 250, or the receiver 312 of the wireless device 302. The means for matching may comprise an application specific integrated circuit, e.g., the processor 230, or the processor 304. The means for evaluating may comprise an application specific integrated circuit, e.g., the processor 230, or the processor 304. The means for indicating may comprise an application specific integrated circuit, e.g., the processor 230, or the processor 304. The means for scheduling may comprise an application specific integrated circuit, e.g., the processor 230, or the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
generating, at a first user device, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from a scheduling apparatus to the first user device, and wherein a second layer of the PMI comprises a second CQI indicating performance of the MU communication that comprises an anticipated transmission by the scheduling apparatus to a second user device performed simultaneously with another anticipated transmission by the scheduling apparatus to the first user device; and
transmitting the feedback report to the scheduling apparatus.

2. The method of claim 1, wherein:
the PMI indicates a plurality of layers associated with a plurality of simultaneous transmissions by the scheduling apparatus,
the PMI is used at the scheduling apparatus for the potentially simultaneous transmissions, and
each column of a matrix structure of the PMI indicates one of the layers.

3. The method of claim 1, wherein:
the PMI is used at the scheduling apparatus for the anticipated transmission and the other anticipated transmission.

4. The method of claim 1, wherein a structure of the feedback report is matched with a structure of another feedback report transmitted to the scheduling apparatus by the second user device.

5. The method of claim 1, further comprising:
identifying a set of precoding information within a defined performance range compared to other precoding information tailored solely to the SU communication, and
wherein the feedback report comprises selected precoding information from the set such that performance of the MU communication is at a particular level.

6. The method of claim 1, further comprising:
signaling that the feedback report is associated with one of the MU communications by including Rank Indicator (RI) of a defined value in the feedback report.

7. The method of claim 1, further comprising:
signaling that the feedback report is associated with one of the MU communications by including a defined value of the first CQI or the second CQI in the feedback report,
wherein the defined value of the first CQI or the second CQI is indicative of interference resulting from the transmission to the second user device measured at the first user device.

8. The method of claim 1, wherein:
the feedback report comprises precoding information potentially to be used by the scheduling apparatus for the transmission and the other anticipated transmission, and
the precoding information is chosen as preferred among a set of precoding information.

9. The method of claim 8, further comprising:
receiving signaling, from the scheduling apparatus based on Radio Resource Control (RRC) signaling, about the set of precoding information.

10. The method of claim 1, wherein:
a column of a matrix structure of the PMI indicates the layer associated with the transmission from the scheduling apparatus to the second user device,
and other column of the matrix structure indicates another layer associated with the other anticipated transmission from the scheduling apparatus to the first user device.

11. The method of claim 1, wherein:
the combination the first CQI and the second CQI indicates a level of interference associated with communication on an interlace,
the combination of the first CQI and the second CQI conveys a rank associated with the feedback report on the interlace.

12. An apparatus for wireless communications, comprising:
means for generating a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from a scheduling apparatus to the apparatus, and wherein a second layer of the PMI comprises a second CQI indicating performance of the MU communication that comprises an anticipated transmission by the scheduling apparatus to another apparatus performed simultaneously with another anticipated transmission by the scheduling apparatus to the apparatus; and
means for transmitting the feedback report to the scheduling apparatus.

13. The apparatus of claim 12, wherein:
the PMI indicates a plurality of layers associated with a plurality of simultaneous transmissions by the scheduling apparatus,
the PMI is used at the scheduling apparatus for the potentially simultaneous transmissions, and
each column of a matrix structure of the PMI indicates one of the layers.

14. The apparatus of claim 12, wherein:
the PMI is used at the scheduling apparatus for the anticipated transmission and the other anticipated transmission.

15. The apparatus of claim 12, wherein a structure of the feedback report is matched with a structure of another feedback report transmitted to the scheduling apparatus by the other apparatus.

16. The apparatus of claim 12, further comprising:
identifying a set of precoding information within a defined performance range compared to other precoding information tailored solely to the SU communication, and
wherein the feedback report comprises selected precoding information from the set such that performance of the MU communication is at a particular level.

17. The apparatus of claim 12, further comprising:
signaling that the feedback report is associated with one of the MU communications by including Rank Indicator (RI) of a defined value in the feedback report.

18. The apparatus of claim 12, further comprising:
means for signaling that the feedback report is associated with one of the MU communications by including a defined value of the first CQI or the second CQI in the feedback report,
wherein the defined value of the first CQI or the second CQI is indicative of interference resulting from the transmission to the other apparatus measured at the apparatus.

19. The apparatus of claim 12, wherein:
the feedback report comprises precoding information potentially to be used by the scheduling apparatus for the transmission and the other anticipated transmission, and
the precoding information is chosen as preferred among a set of precoding information.

20. The apparatus of claim 19, further comprising:
means for receiving signaling, from the scheduling apparatus based on Radio Resource Control (RRC) signaling, about the set of precoding information.

21. The apparatus of claim 12, wherein:
a column of a matrix structure of the PMI indicates the layer associated with the transmission from the scheduling apparatus to the second user device, and
other column of the matrix structure indicates another layer associated with the other anticipated transmission from the scheduling apparatus to the first user device.

22. The apparatus of claim 12, wherein:
the combination (the first CQI) and the second CQI indicates a level of interference associated with communication on an interlace,
the combination of the first CQI and the second CQI conveys a rank associated with the feedback report on the interlace.

23. An apparatus for wireless communications, comprising:
a first circuit configured to generate a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from a scheduling apparatus to the apparatus, and wherein a second layer of the PMI comprises a second CQI indicating performance of the MU communication that comprises an anticipated transmission by the scheduling apparatus to another apparatus performed simultaneously with another anticipated transmission by the scheduling apparatus to the apparatus; and a transmitter configured to transmit the feedback report to the scheduling apparatus.

24. A non-transitory computer readable medium containing executable instructions for wireless communications, the executable instructions comprising instructions for:

generating, at a first user device, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from a scheduling apparatus to the first user device, and wherein a second layer of the PMI comprises a second CQI indicating performance of the MU communication that comprises an anticipated transmission by the scheduling apparatus to a second user device performed simultaneously with another anticipated transmission by the scheduling apparatus to the first user device; and transmitting the feedback report to the scheduling apparatus.

25. An access terminal, comprising:

at least one antenna;

a first circuit configured to generate a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from a scheduling apparatus to the access terminal, wherein a second layer of the PMI comprises a second CQI indicating performance of the MU communication that comprises an anticipated transmission by an access point to another access terminal performed simultaneously with another anticipated transmission by the scheduling apparatus to the access terminal; and a transmitter configured to transmit, via the at least one antenna, the feedback report to the access point.

26. A method for wireless communications, comprising:

receiving, at a scheduling apparatus, from each of a plurality of apparatuses, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from the scheduling apparatus to that apparatus, wherein a second layer of the PMI comprises a second CQI indicating performance of the MU communication that comprises an anticipated transmission by the scheduling apparatus to another apparatus performed simultaneously with another anticipated transmission by the scheduling apparatus to that apparatus; and identifying, based on the feedback reports, at least two of the apparatuses for potential simultaneous transmissions from the scheduling apparatus to the at least two apparatuses, wherein information in a first feedback report transmitted from a first of the at least two apparatuses matches information in a second feedback report transmitted from a second of the at least two apparatuses.

27. The method of claim 26, wherein identifying further comprises:

matching precoding information indicated in the first feedback report with other precoding information indicated in the second feedback report, and wherein the precoding information is used for transmission to the first apparatus and the other precoding information is used for transmission to the second apparatus.

28. The method of claim 26, further comprising:

evaluating performance of communicating with the at least two apparatuses based on the feedback reports and a defined error value.

29. The method of claim 26, further comprising:

indicating to each of the apparatuses a set of precoding information using Radio Resource Control (RRC) signaling, wherein one of the precoding information from the set is chosen at that apparatus to be used by the scheduling apparatus for potentially simultaneous transmission to that apparatus and to another apparatus of the plurality of apparatuses.

30. The method of claim 29, wherein the chosen precoding information from the set comprises information about a pair of precoders potentially to be applied by the scheduling apparatus before the simultaneous transmission.

31. The method of claim 26, wherein:

a combination of the first CQI and the second CQI indicates a level of interference associated with communication on an interlace, and the method further comprising determining, based on the combination of the first CQI and the second CQI, a rank associated with that feedback report on the interlace.

32. An apparatus for wireless communications, comprising:

means for receiving, from each of a plurality of apparatuses, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from the apparatus to one of the plurality of apparatuses, wherein a second layer of the PMI comprises a second CQI indicating performance of the MU communication that comprises an anticipated transmission by the apparatus to another of the plurality of apparatuses performed simultaneously with another anticipated transmission by the apparatus to that apparatus; and means for identifying, based on the feedback reports, at least two of the apparatuses for potential simultaneous transmissions from the apparatus to the at least two apparatuses, wherein information in a first feedback report transmitted from a first of the at least two apparatuses matches information in a second feedback report transmitted from a second of the at least two apparatuses.

33. The apparatus of claim 32, wherein the means for identifying further comprises:

means for matching precoding information indicated in the first feedback report with other precoding information indicated in the second feedback report, and wherein the precoding information is used for transmission to the first apparatus and the other precoding information is used for transmission to the second apparatus.

34. The apparatus of claim 32, further comprising:

means for evaluating performance of communicating with the at least two apparatuses based on the feedback reports and a defined error value.

35. The apparatus of claim 32, further comprising:
means for indicating to each of the apparatuses a set of precoding information using Radio Resource Control (RRC) signaling,
wherein one of the precoding information from the set is chosen at that apparatus to be used by the apparatus for potentially simultaneous transmission to that apparatus and to another apparatus of the plurality of apparatuses.

36. The apparatus of claim 35, wherein the chosen precoding information from the set comprises information about a pair of precoders potentially to be applied by the apparatus before the simultaneous transmission.

37. The apparatus of claim 32, wherein:
a combination of the first CQI and the second CQI indicates a level of interference associated with communication on an interlace, and the apparatus further comprising
means for determining, based on the combination of the first CQI and the second CQI, a rank associated with that feedback report on the interlace.

38. An apparatus for wireless communications, comprising:
a receiver configured to receive, from each of a plurality of apparatuses, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from the apparatus to one of the plurality of apparatuses, wherein a second layer of the PMI comprises a second CQI indicating performance of the MU communication that comprises an anticipated transmission by the apparatus to another of the plurality of apparatuses performed simultaneously with another anticipated transmission by the apparatus to that apparatus; and
a first circuit configured to identify, based on the feedback reports, at least two of the apparatuses for potential simultaneous transmissions from the apparatus to the at least two apparatuses,
wherein information in a first feedback report transmitted from a first of the at least two apparatuses matches information in a second feedback report transmitted from a second of the at least two apparatuses.

39. A non-transitory computer readable medium containing executable instructions for wireless communications, the executable instructions comprising instructions for:
receiving, at a scheduling apparatus, from each of a plurality of apparatuses, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from the scheduling apparatus to one of the plurality of apparatuses, wherein a second layer of the PMI comprises a second CQI indicating performance of the MU communication that comprises an anticipated transmission by the scheduling apparatus to another of the plurality of apparatuses performed simultaneously with another anticipated transmission by the scheduling apparatus to that apparatus; and
identifying, based on the feedback reports, at least two of the apparatuses for potential simultaneous transmissions from the scheduling apparatus to the at least two apparatuses,
wherein information in a first feedback report transmitted from a first of the at least two apparatuses matches information in a second feedback report transmitted from a second of the at least two apparatuses.

40. An access point, comprising:
at least one antenna;
a receiver configured to receive, from a each of a plurality of apparatuses via the at least one antenna, a feedback report, wherein the feedback report comprises a single precoding matrix indicator (PMI) with feedback for both single user (SU) and multi user (MU) communications, wherein a first layer of the PMI comprises a first Channel Quality Indicator (CQI) indicating performance of the SU communication from the access point to one of the plurality of apparatuses, wherein a second layer of the PMI comprises a second CQI indicating performance of the MU communication that comprises an anticipated transmission by the access point to another of the plurality of apparatuses performed simultaneously with another anticipated transmission by the access point to that apparatus; and
a first circuit configured to identify, based on the feedback reports, at least two of the access terminals for potential simultaneous transmissions from the access point to the at least two access terminals,
wherein information in a first feedback report transmitted from a first of the at least two apparatuses matches information in a second feedback report transmitted from a second of the at least two apparatuses.

* * * * *